(12) United States Patent
Wang et al.

(10) Patent No.: US 12,451,927 B2
(45) Date of Patent: Oct. 21, 2025

(54) DISPLAY PANEL AND DISPLAY APPARATUS

(71) Applicants: Beijing BOE Optoelectronics Technology Co., Ltd., Beijing (CN); BOE Technonlogy Group Co. Ltd., Beijing (CN)

(72) Inventors: Xian Wang, Beijing (CN); Yu Zhao, Beijing (CN); Yong Zhang, Beijing (CN); Jian Wang, Beijing (CN); Xiaojuan Wu, Beijing (CN); Dawei Feng, Beijing (CN); Lei Shi, Beijing (CN); Yang Ge, Beijing (CN); Jianwei Ma, Beijing (CN); Biqi Li, Beijing (CN); Feng Qu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/291,940

(22) PCT Filed: Oct. 18, 2021

(86) PCT No.: PCT/CN2021/124470
§ 371 (c)(1),
(2) Date: Jan. 25, 2024

(87) PCT Pub. No.: WO2023/065073
PCT Pub. Date: Apr. 27, 2023

(65) Prior Publication Data
US 2025/0096846 A1    Mar. 20, 2025

(51) Int. Cl.
*H04B 5/43* (2024.01)
*G02F 1/1362* (2006.01)
(Continued)

(52) U.S. Cl.
CPC ......... *H04B 5/43* (2024.01); *G02F 1/136209* (2013.01); *G02F 1/136222* (2021.01);
(Continued)

(58) Field of Classification Search
CPC ....... H04B 5/43; H04B 5/26; G02F 1/136222; G02F 1/136209; G02F 1/136286; G06F 3/041; G06F 3/046
See application file for complete search history.

(56) References Cited

U.S. PATENT DOCUMENTS 9,859,310 B2    1/2018    Xu et al.
10,327,341 B2    6/2019    Suzuki et al.
(Continued)

FOREIGN PATENT DOCUMENTS

CN    101308266 A    11/2008
CN    101308266 B    6/2010
(Continued)

OTHER PUBLICATIONS

International Search Report of PCT application No. PCT/CN2021/124470 dated Jul. 12, 2022.
(Continued)

*Primary Examiner* — Sardis F Azongha
(74) *Attorney, Agent, or Firm* — Calfee, Halter & Griswold LLP

(57) ABSTRACT

A display panel and a display device are provided. The display panel has a display area and a binding area. The display panel includes a color film substrate and an array substrate, wherein the color film substrate includes a near-field communication antenna, the near-field communication antenna includes a coil structure, and the coil structure is at least partially located in the display area; and the array substrate includes a first base substrate, a channel region and a non-channel region, wherein an orthographic projection of
(Continued)

the coil structure on the first base substrate is located within an orthographic projection of the non-channel region on the first base substrate.

18 Claims, 12 Drawing Sheets

(51) Int. Cl.
 *G06F 3/046* (2006.01)
 *H04B 5/26* (2024.01)
(52) U.S. Cl.
 CPC ........ *G02F 1/136286* (2013.01); *G06F 3/046* (2013.01); *H04B 5/26* (2024.01)

(56) References Cited

U.S. PATENT DOCUMENTS

| | | | |
|---|---|---|---|
| 10,701,815 | B2 | 6/2020 | Suzuki et al. |
| 10,763,574 | B2 | 9/2020 | Cao et al. |
| 11,005,153 | B1 | 5/2021 | Zhu et al. |
| 2017/0047361 | A1 | 2/2017 | Xu et al. |
| 2018/0220540 | A1 | 8/2018 | Suzuki et al. |
| 2019/0198979 | A1 | 6/2019 | Cao et al. |
| 2019/0237875 | A1* | 8/2019 | Yamagishi ....... G06K 19/07773 |
| 2019/0261521 | A1 | 8/2019 | Suzuki et al. |
| 2021/0028649 | A1 | 1/2021 | Ren et al. |

FOREIGN PATENT DOCUMENTS

| | | |
|---|---|---|
| CN | 202351831 U | 7/2012 |
| CN | 205281463 U | 6/2016 |
| CN | 106098702 A | 11/2016 |
| CN | 106950748 A | 7/2017 |
| CN | 108388037 A | 8/2018 |
| CN | 110211973 A | 9/2019 |
| CN | 111258459 A | 6/2020 |
| CN | 111323953 A | 6/2020 |
| CN | 111399286 A | 7/2020 |
| CN | 111477123 A | 7/2020 |
| CN | 112003011 A | 11/2020 |
| CN | 112327535 A | 2/2021 |
| CN | 112462560 A | 3/2021 |
| CN | 112882271 A | 6/2021 |
| CN | 112968044 A | 6/2021 |
| IN | 201624037486 A | 12/2016 |

OTHER PUBLICATIONS

Written opinion of PCT application No. PCT/CN2021/124470 dated Jul. 12, 2022.
Extended European Search Report of EP application No. 21960834.6 dated Jul. 11, 2024.
First Office Action of application No. 2021800029489 dated Dec. 28, 2024.

* cited by examiner

DISPLAY PANEL AND DISPLAY APPARATUS

CROSS REFERENCE TO RELATED APPLICATIONS

The present disclosure is the U.S. national phase application of International Application No. PCT/CN2021/124470 filed on Oct. 18, 2021, the content of which is incorporated herein by reference in its entirety for all purposes.

TECHNICAL FIELD

The present disclosure relates to the field of display technology, in particular to a display panel and a display device including the same.

BACKGROUND

Near Field Communication (NFC) is a non-contact identification and interconnection technology that uses near-field magnetic field communication, which has advantages of low cost, high bandwidth, fast response speed, and good security. The NFC can achieve wireless communication in a close range between the mobile device and the consumer electronics, and has been widely used in fields such as mobile payment, electronic ticket, access control, and anti-counterfeiting.

It should be noted that the information disclosed in the above section is only intended to enhance the understanding of the background of the present disclosure, and thus can include information that does not constitute the prior art already known to those skilled in the art.

SUMMARY

According to one aspect of the present disclosure, a display panel is provided, including a display area and a binding area, wherein the display panel includes: a color film substrate including a near-field communication antenna, wherein the near-field communication antenna includes a coil structure, and the coil structure is at least partially located in the display area; and an array substrate including a first base substrate, a channel region, and a non channel region, wherein an orthographic projection of the coil structure on the first base substrate is located within an orthographic projection of the non channel region on the first base substrate.

According to another aspect of the present disclosure, a display device is provided, including a display panel as described in the above.

It should be understood that the general description above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

Figure 1:
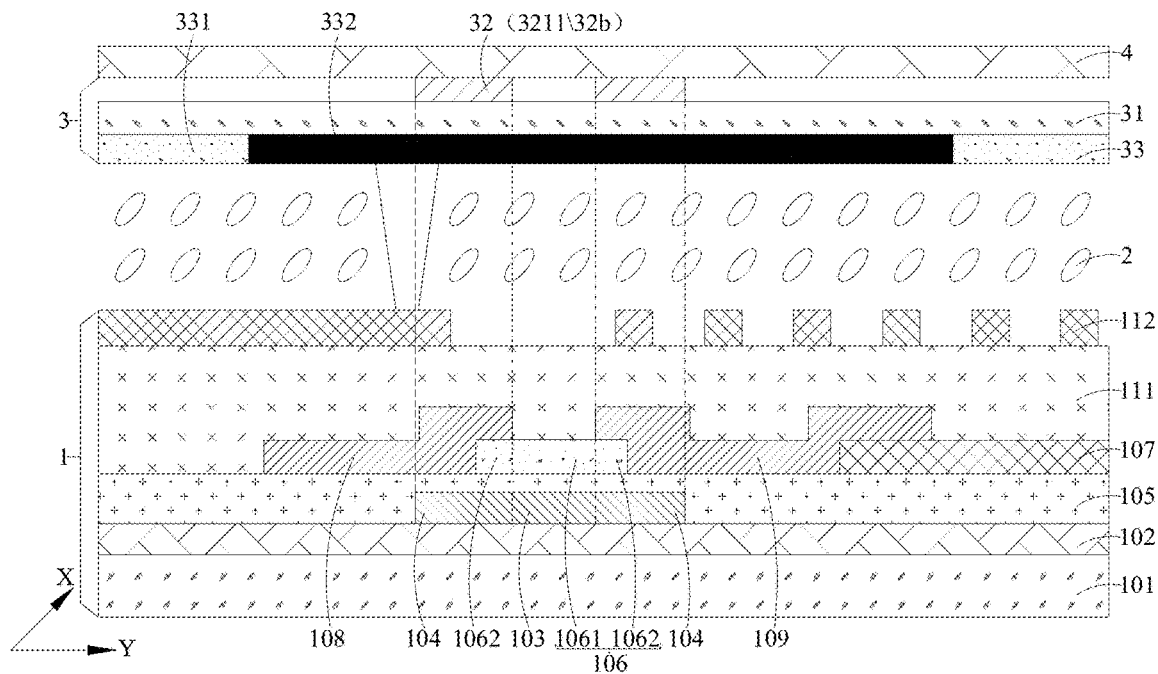
FIG. 1 is a schematic diagram of a structure of an example display panel according to embodiments of the present disclosure.

EXPLANATIONS OF REFERENCE NUMERALS 1. array substrate; 101. first base substrate; 102. buffer layer; 103. gate; 104. gate line; 105. gate insulation layer; 106. active layer; 1061. channel region; 1062. conductor region; 107. pixel electrode; 108. source; 109. drain; 110. data line; 111. first insulation layer; 112. common electrode; 113. touch wire;
2. liquid crystal layer;
3. color film substrate; 31. second base substrate;
32. near-field communication antenna; 321. first wire; 3211. annular wire; 3212. connection wire; 322. second wire; 3221. first sub wire; 3222. second sub wire; 32*a*. first metal layer; 32*a*1. bridging strip; 32*b*. second metal layer; 32*b*1. multiple turns of spiral coil; 32*b*2. first leading-out end; 32*b*3. second leading-out end; 32*b*4. single-turn coil; 32*b*5. third leading-out end;

32b6. fourth leading-out end; 32b7. connection line; 32b71. first part; 32b72. second part; 32b8. head connection end; 32b9. tail connection end; 32c. second insulation layer; 32c1. first via hole; 32c2. second via hole;
33. light filtering layer; 331. light filtering part; 332. black matrix; 34. third insulation layer; 35. coil structure; 351. coil part; 352. leading-out end;
4. anti-reflective layer; 5. binding pin; 6. conductive film; 7. protection layer; 8. connection pin; 9. material layer for binding pin;
AA. display area; BOD. binding area.

DETAILED DESCRIPTION

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The same reference numerals in the drawings represent the same or similar structures, and thus their detailed descriptions will be omitted. In addition, the drawings are only illustrative and are not necessarily drawn to scale.

Although relative terms such as "up" and "down" are used in this specification to describe the relative relationship between one component and another component of an icon, these terms are only used for convenience in this specification, for example, according to an example direction described in the drawings. It can be understood that if the device of the icon is flipped so that it is upside down, the component described as "up" will become the component described as "down". When a certain structure is "on" other structures, it may mean that a structure is formed as a whole on the other structures, or a structure is "directly" arranged on the other structures, or a structure is "indirectly" arranged on the other structures through another structure.

Terms "one", "a", "the", "said", and "at least one" are used to indicate the existence of one or more elements/components/etc. Terms "include" and "has" are used to indicate open inclusion and refer to the existence of additional elements/components/etc. in addition to the listed ones. Terms "first", "second", and "third" are only used as reference numerals and are not intended to limit the quantity of objects.

The near field communication technology requires the installation of a near-field communication antenna 32 on equipment for transmitting and receiving electromagnetic wave signals. The near-field communication antenna 32 need to occupy a large space. The existing electronic device that uses the near-field communication technology mostly places an independent near-field communication module externally on a motherboard of the electronic device, which requires a large space and is not conducive to the lightweight design of the electronic device.

Embodiments of the present disclosure provide a display panel. As shown in FIGS. 1 to 15, the display panel includes a display area AA and a binding area BOD. The display panel can include a color film substrate 3 and an array substrate 1. The color film substrate 3 can include a near-field communication antenna 32. The near-field communication antenna 32 includes a coil structure 35, and the coil structure 35 is at least partially located in the display area AA. The array substrate 1 can include a first base substrate 101, a channel region 1061, and a non channel region. An orthographic projection of the coil structure 35 on the first base substrate 101 is located within an orthographic projection of the non channel region on the first base substrate 101.

For the display panel according to embodiments of the present disclosure, the near-field communication antenna 32 would not affect the display of the display area AA, and the near-field communication antenna 32 is made far away from the array substrate 1, which can greatly reduce the electromagnetic interference generated by the near-field communication antenna 32 on the display signal during operation, ensuring the normal operation of other modules or electronic components of the display panel. The orthographic projection of the coil structure 35 on the first base substrate 101 is located within the orthographic projection of the non channel region on the first base substrate 101, that is, the orthographic projection of the channel region 1061 on the first base substrate 101 does not overlap with the orthographic projection of the coil structure 35 on the first base substrate 101, which further reduces the electromagnetic interference generated by the near-field communication antenna 32 on the thin film transistor during operation and improves the display effect of the display panel. The near-field communication antenna 32 is integrated on the color film substrate 3, which is conducive to the lightweight of the display panel. The near-field communication antenna 32 does not need to be arranged within a border around the display area AA. Therefore, the display panel will not increase the width of the border due to the requirement for the near-field communication function, which is conducive to the reduction of the width of the border of the display panel, thereby increasing the proportion of the display area AA of the electronic device and improving the user experience.

In some embodiments, the array substrate 1 can further include a first base substrate 101. The first base substrate can be a rigid substrate, for example, a glass substrate. The first base substrate 101 can be a flexible substrate, for example, a PI (polyimide) substrate.

A buffer layer 102 is provided on a side of the first base substrate 101.

A gate pattern is provided on a side of the buffer layer 102 away from the first base substrate 101. The gate pattern can include a gate 103 and a gate line 104, and the gate line 104 extends in a first direction.

A gate insulation layer 105 is provided on a side of the gate pattern away from the first base substrate 101. An active layer 106 is provided on a side of the gate insulation layer 105 away from the first base substrate 101. The active layer 106 can include a channel region 1061 and two conductor regions 1062 located on both sides of the channel region 1061. The channel region 1061 refers to a region where a current mainly flows. The channel region 1061 and the gate 103 are provided opposite to each other. The channel region 1061 is controlled to be opened or not to be opened by inputting a current or a voltage to the gate 103.

A pixel electrode 107 is provided on a side of the gate insulation layer 105 away from the first base substrate 101. The pixel electrode 107 and the active layer 106 are separated from each other, that is, there is a gap provided between the pixel electrode 107 and the active layer 106. A material of the pixel electrode 107 can be ITO.

A source and drain pattern is provided on a side of the active layer 106 away from the first base substrate 101. The source and drain pattern can include a data line 110, a source 108, and a drain 109. The source 108 and the drain 109 are respectively connected to two conductor regions 1062 in the active layer 106. The data line 110 is connected to the source 108, and the pixel electrode 107 is connected to the drain 109. In the case where a thin film transistor with opposite polarity is used, or a current direction during the circuit operation is changed, the functions of "source 108" and "drain 109" are sometimes interchanged with each other. Therefore, in this specification, the "source 108" and the "drain 109" can be interchanged with each other.

Figure 2:
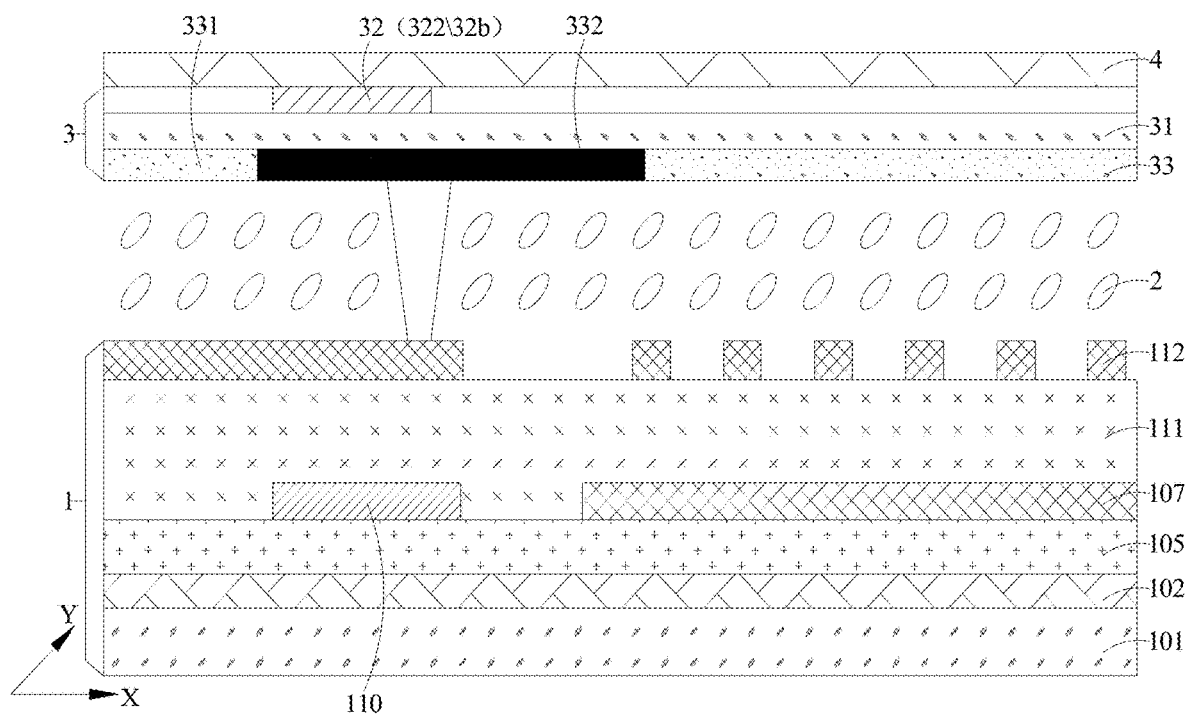
FIG. 2 is a schematic diagram of a structure of an example display panel according to embodiments of the present disclosure.

As shown in FIG. 2, the data line 110 extends along a second direction, and the first direction intersects with the second direction.

It should be noted that the gate 103, the active layer 106, the source 108, and the drain 109 form a thin film transistor. An array of multiple thin film transistors is arranged on a side of the first base substrate 101. The thin film transistor described above is a bottom-gate type thin film transistor. In some embodiments of the present disclosure, the thin film transistor can also be a top-gate type thin film transistor or a double-gate type thin film transistor, which will not be explained in detail herein.

A first insulation layer 111 is provided on a side of the source and drain pattern away from the first base substrate 101.

A common electrode 112 is provided on a side of the first insulation layer 111 away from the first base substrate 101. A material of the common electrode 112 can be ITO.

In addition, in some embodiments of the present disclosure, the common electrode 112 can also be arranged on a side of the pixel electrode 107 close to the first base substrate 101. The pixel electrode 107 can be connected to the source 108 or the drain 109 through a via hole in the first insulation layer 111.

Figure 3:
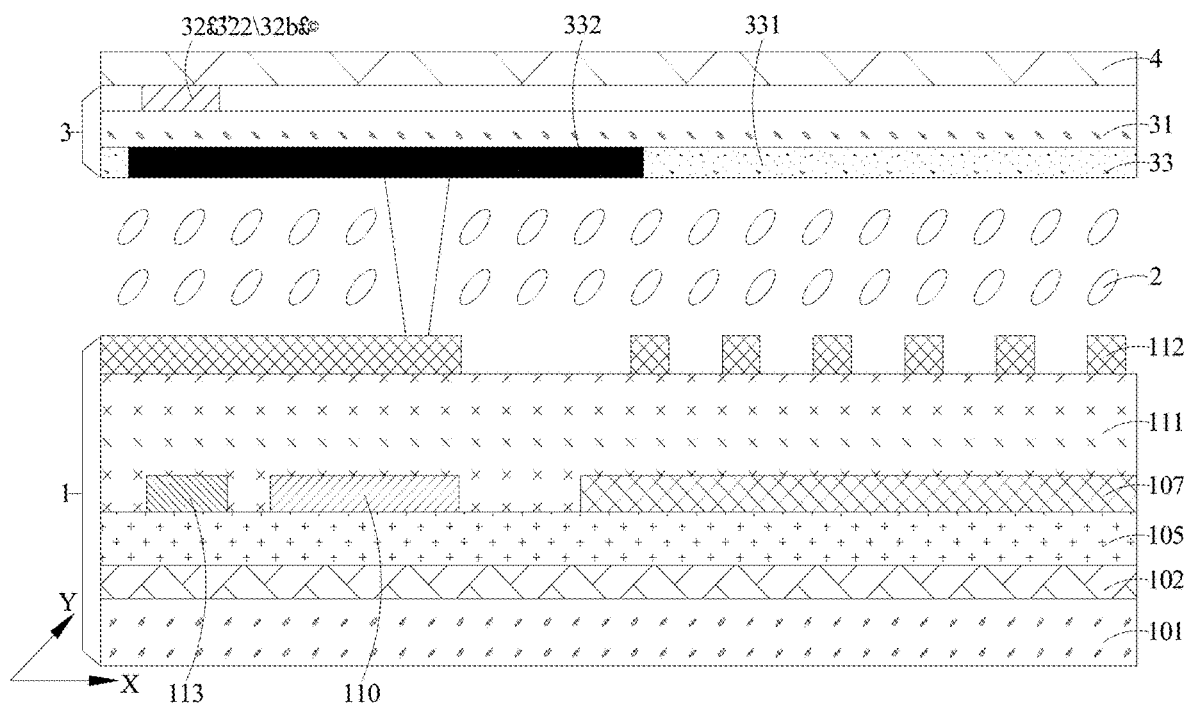
FIG. 3 is a schematic diagram of a structure of an example display panel according to embodiments of the present disclosure.

In some embodiments of the present disclosure, as shown in FIG. 3, the display panel can be a TDDI (Touch and Display Driver Integration) product, where a touch pattern is also provided on the array substrate 1. The touch pattern can include touch leads, which can be arranged on the same layer as the data line 110, with the same material being used. That is, the touch leads and the data line 110 can be formed through one same patterning process. The touch lead extends in the second direction, that is, an extension direction of the touch lead is consistent with an extension direction of the data line 110. In this case, the common electrode 112 can be multiplexed as a touch electrode. A via hole can be arranged in the first insulation layer 111. The touch electrode can be connected to the touch lead through the via hole to transmit a touch signal to a touch chip.

In some embodiments of the present disclosure, the display panel can be an OLED (Organic Light Emitting Diode) display panel, and the thin film transistor of the OLED display panel can be the thin film transistor of the above structures, which will not be repeated herein.

The OLED display panel can further include a planarization layer, a first electrode, a pixel definition layer, a light-emitting layer, and a second electrode. The planarization layer is arranged on a side of the source and drain pattern of the thin film transistor away from the base substrate. A third via hole is provided in the planarization layer, which is connected to the source 108 or the drain 109. The first electrode is arranged on a side of the planarization layer away from the base substrate. The first electrode can be an anode. The first electrode is connected to the source 108 or the drain 109 through the third via in the planarization layer. The pixel definition layer is arranged on a side of the first electrode away from the base substrate. A fourth via hole is further provided in the pixel definition layer, which is connected to the first electrode. The light-emitting layer is provided within the fourth via hole. The light-emitting layer is in contact with the first electrode. The thin-film transistor can control the brightness of the light-emitting layer through the first electrode. The second electrode is arranged on a side of the light-emitting layer away from the base substrate. The second electrode can be a cathode.

In the case where the display panel is a liquid crystal display panel, a liquid crystal layer 2 is arranged between the array substrate 1 and the color film substrate 3.

In some embodiments, as shown in FIG. 1, the color film substrate 3 can include a second base substrate 31. The second base substrate 31 can be a rigid substrate, for example, a glass substrate. The second base substrate 31 can be a flexible substrate, for example, a PI (polyimide) substrate.

A light filtering layer 33 is provided on a side of the second base substrate 31 close to the array substrate 1, and a near-field communication antenna 32 is provided on a side of the second base substrate 31 away from the array substrate 1. That is, the near-field communication antenna 32 and the light filtering layer 33 are arranged on opposite sides of the second base substrate 31. From the side close to the array substrate 1, the light filtering layer 33, the second base substrate 31, and the near-field communication antenna 32 are sequentially arranged. Due to the fact that the array substrate 1 needs to be powered on for operation, the near-field communication antenna 32 also needs to be powered on for operation. When both the array substrate 1 and the near-field communication antenna 32 are powered on simultaneously, signal interference will occur. By locating the near-field communication antenna 32 on a side of the second base substrate 31 away from the array substrate 1, electromagnetic interference of the near-field communication antenna 32 on the signal of the array substrate 1 can be further avoided.

The light filtering layer 33 can include multiple light filtering parts 331 and a black matrix 332, with the multiple light filtering parts 331 being arranged in an array on a side of the first base substrate. The multiple light filtering parts 331 can include a red light filtering part 331, a blue light filtering part 331, and a green light filtering part 331. The black matrix 332 is arranged between adjacent light filtering parts 331.

Figure 4:
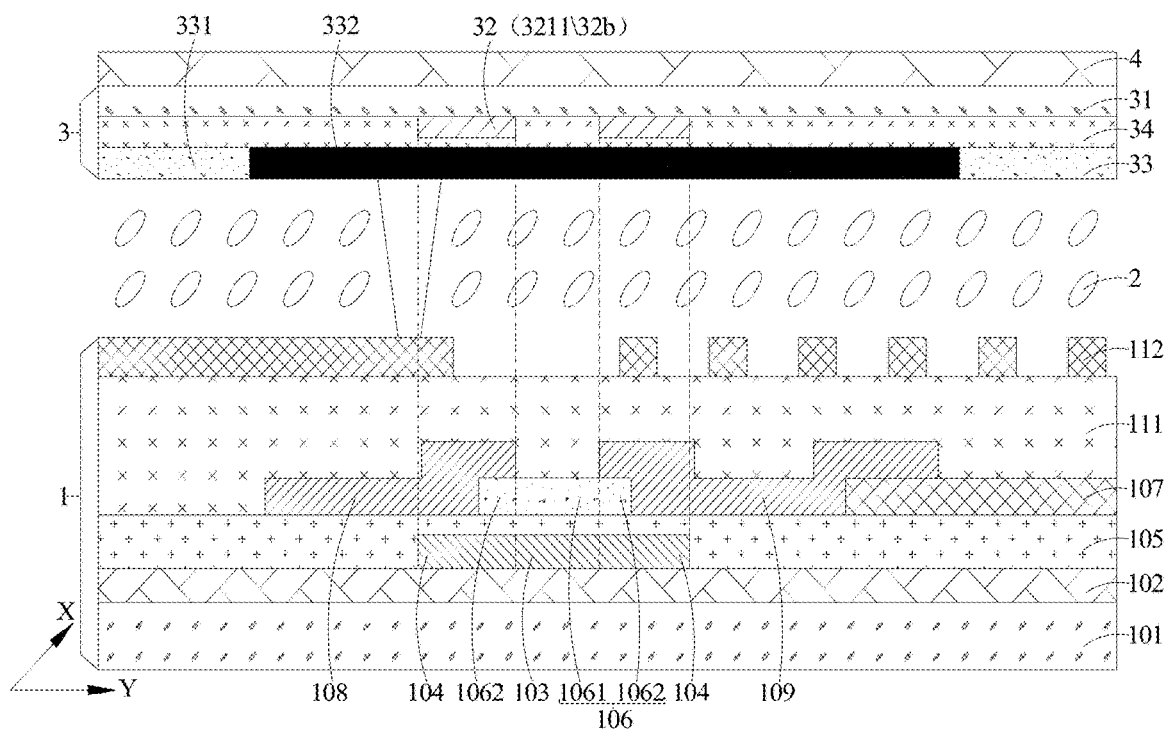
FIG. 4 is a schematic diagram of a structure of an example display panel according to embodiments of the present disclosure.

In some embodiments of the present disclosure, the light filtering layer 33 can be arranged between the second base substrate 31 and the near-field communication antenna 32. From the side close to the array substrate 1, the near-field communication antenna 32, the light filtering layer 33, and the second base substrate 31 are sequentially arranged. The light filtering layer 33 can also be arranged on a side of the near-field communication antenna 32 away from the second base substrate 31, as shown in FIG. 4. From the side close to the array substrate 1, the light filtering layer 33, the near-field communication antenna 32, and the second base substrate 31 are sequentially arranged.

It should be noted that when the near-field communication antenna 32 is arranged adjacent to the light filtering layer 33, a third insulation layer 34 can be provided between the near-field communication antenna 32 and the light filtering layer 33, so as to isolate the near-field communication antenna 32 and the light filtering layer 33.

A detailed explanation of the specific structure of the near-field communication antenna 32 will be provided in the following.

The near-field communication antenna 32 can include a coil structure 35, and the coil structure 35 is at least partially located in the display area AA.

Figure 5:
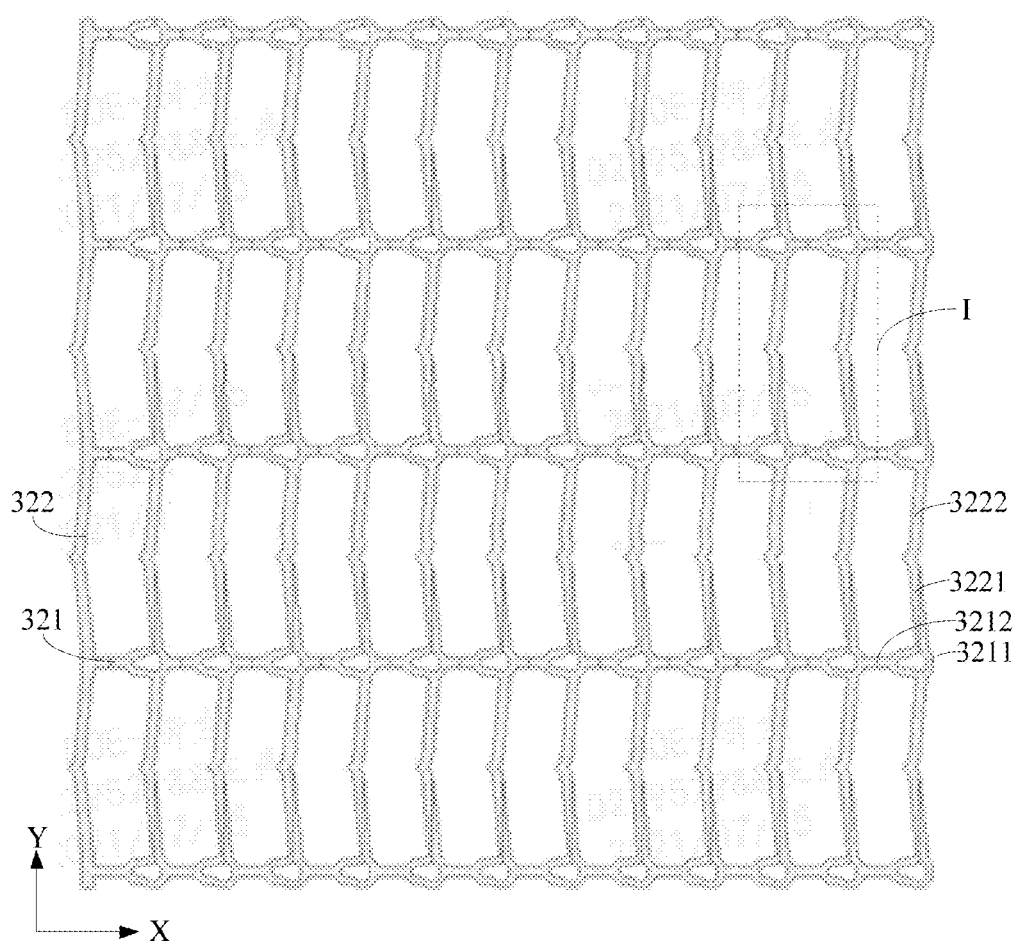
FIG. 5 is a schematic diagram of a partial structure of a near-field communication antenna in FIG. 1, which is a metal grid structure.
Figure 6:
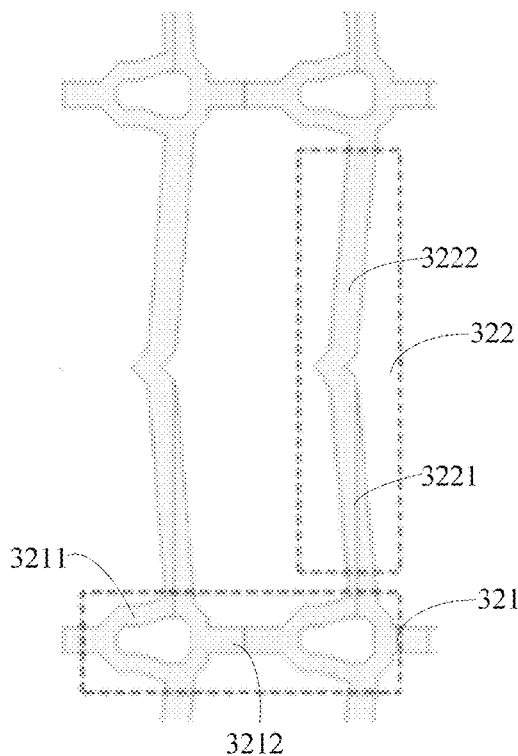
FIG. 6 is a partially enlarged schematic diagram of a portion indicated by I in FIG. 5.

As shown in FIGS. 5 and 6, the coil structure 35 can be provided as a metal grid structure, which can be made of conductive metals such as copper and aluminum. In some embodiments, the metal grid structure can include multiple first wires 321 and multiple second wires 322. The first wires 321 extend in a first direction, the second wires 322 extend in a second direction, and the first direction intersects with the second direction. The multiple first wires 321 are connected with the multiple second wires 322 to form a metal grid structure. The coil structure 35 in the form of the metal grid structure can transmit light without affecting the display of the display area AA. The metal grid structure can greatly reduce the resistance of the near-field communication antenna 32, which is conductive to improving the sensitivity and the communication distance of the near-field communication antenna 32.

Orthographic projections of the first wires 321 on the first base substrate 101 are located within orthographic projections of the gate lines 104 on the first base substrate 101, or the orthographic projections of the first wires 321 on the first base substrate 101 coincide with the orthographic projections of the gate lines 104 on the first base substrate 101, so that a width of the first wire 321 is less than or equal to a width of the gate line 104. Orthographic projections of the second wires 322 on the first base substrate 101 can be located within orthographic projections of the data lines 110 on the first base substrate 101, or the orthographic projections of the second wires 322 on the first base substrate 101 can coincide with the orthographic projections of the data lines 110 on the first base substrate 101, so that a width of the second wire 322 is less than or equal to a width of the data line 110.

In some embodiments, the first wires 321 can include multiple annular wires 3211 and multiple connection wires 3212. The annular wire 3211 is arranged in correspondence to the thin film transistor. An orthographic projection of the annular wire 3211 on the first base substrate 101 forms an annular shadow. The annular shadow has an inner ring and an outer ring, and the inner ring and the outer ring form the orthographic projection of the annular wire 3211. The portion inside the inner ring does not belong to the orthographic projection of the annular wire 3211, and the portion outside the outer ring does not belong to the orthographic projection of the annular wire 3211. An orthographic projection of the channel region 1061 on the first base substrate 101 is located within the inner rings of the orthographic projections of the annular wires 3211 on the first base substrate 101, so that the orthographic projection of the channel region 1061 on the first base substrate 101 does not overlap with the orthographic projection of the coil structure 35 on the first base substrate 101, thereby further reducing the electromagnetic interference generated by the near-field communication antenna 32 on the thin film transistor during operation, and improving the display effect of the display panel.

Each of the multiple connection wires 3212 is connected between two adjacent annular wires 3211 in the first direction. The second wire 322 is connected between two adjacent annular wires 3211 in the second direction.

A closed gap part is formed inside the annular wire 3211.

In some embodiments of the present disclosure, an open gap part can be provided. For example, a portion of the first wire 321 can be provided as a bent wire, and an open gap part can be formed inside the bent wire. The orthographic projection of the channel region 1061 on the first base substrate 101 is located within orthographic projections of the gap parts on the first base substrate 101, or the orthographic projection of the channel region 1061 on the first base substrate 101 coincides with the orthographic projections of the gap parts on the first base substrate 101.

In order to be adaptive to the data line 110, the second wire 322 can be provided as a fold line. In some embodiments, the second wire 322 can include a first sub wire 3221 and a second sub wire 3222. An angle between the first sub wire 3221 and the second sub wire 3222 is greater than 90 degrees and less than or equal to 180 degrees. A sharp corner structure can be provided at the connection between the first sub wire 3221 and the second sub wire 3222.

Figure 7:
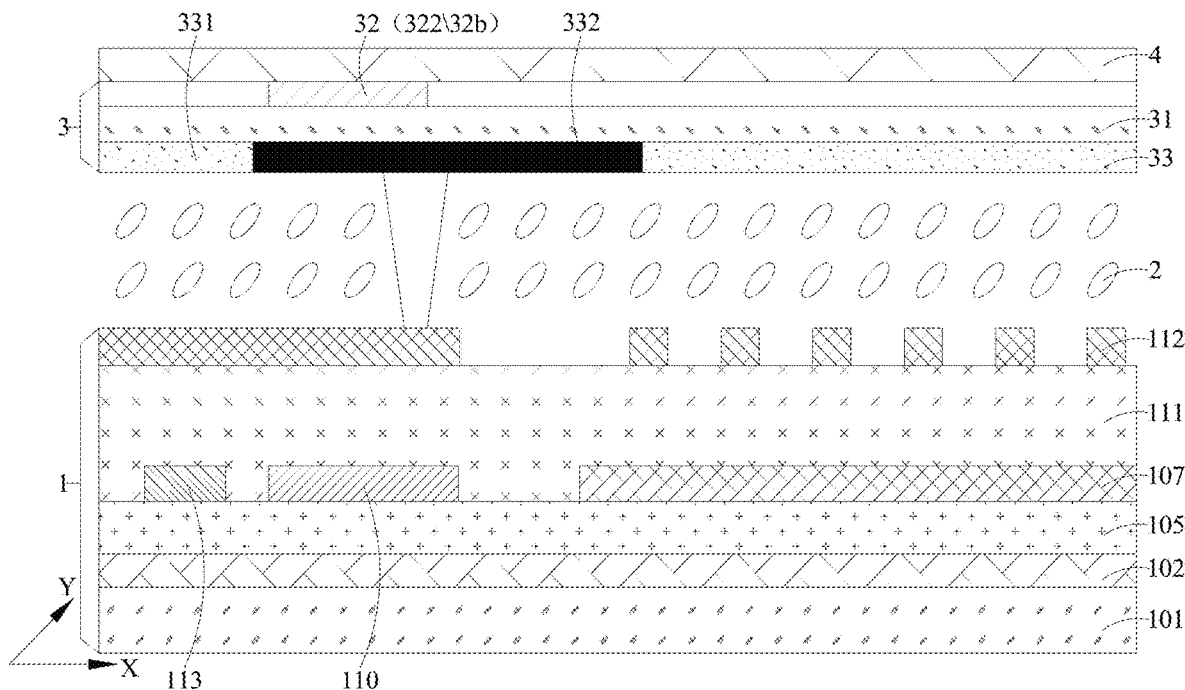
FIG. 7 is a schematic diagram of a structure of an example display panel according to embodiments of the present disclosure.

As shown in FIG. 3, when the array substrate 1 is provided with a touch pattern thereon, orthographic projections of the second wires 322 on the first base substrate 101 can also be located within orthographic projections of touch wires 113 on the first base substrate 101, or the orthographic projections of the second wires 322 on the first base substrate 101 can also coincide with the orthographic projections of the touch wires 113 on the first base substrate 101, so that a width of the second wire 322 is less than or equal to a width of the touch wire 113. In some embodiments, as shown in FIG. 7, when the array substrate 1 is provided with a touch pattern thereon, the orthographic projections of the second wires 322 on the first base substrate 101 can also be located within the orthographic projections of the data lines 110 on the first base substrate 101.

By providing the first wires 321 and the second wires 322 in the way mentioned above, so that the orthographic projections of the first wires 321 on the first base substrate 101 and the orthographic projections of the second wires 322 on the first base substrate 101 are both located within the orthographic projection of the black matrix 332 on the first base substrate 101. Due to the fact that the first wire 321 and the second wire 322 are opaque, it is possible to avoid the impact of the first wire 321 and the second wire 322 on an aperture ratio of the display panel.

Figure 8:
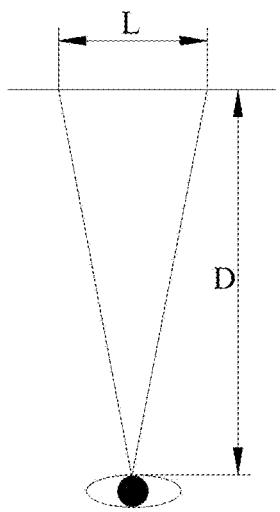
FIG. 8 is a schematic diagram of a light path of a human eye when viewing.
Figure 9:
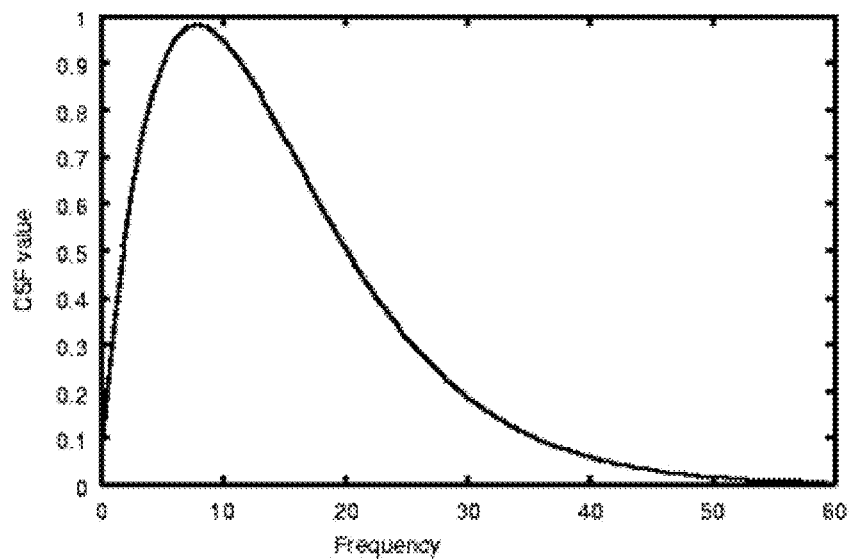
FIG. 9 is a curve of a visual contrast sensitivity function (CSF).

However, since the near-field communication antenna 32 can be arranged on the light output side of the second base substrate 31, it is necessary to provide a cycle of the first wire 321 and the second wire 322 as a cycle that cannot be recognized by a human eye. Referring to FIGS. 8 and 9, where a schematic diagram of a light path of a human eye when viewing is shown in FIG. 8, and a curve of a visual contrast sensitivity function (CSF) is shown in FIG. 9, when the horizontal axis (frequency) is around 10, the human eye has the strongest ability to distinguish blurred objects, and the CSF value on the vertical axis can reach 0.99. As the horizontal axis increases, the ability of the human eye to distinguish blurred objects gradually weakens. Therefore, it is necessary to set the horizontal axis larger to achieve the effect that the human eye cannot recognize the first wire 321 and the second wire 322.

a formula for the visual contrast sensitivity function (CSF):

$$X = \frac{L}{\text{Cycle}} = \frac{2 \times D \times \text{Tan}(0.5°)}{\text{Cycle}},$$

where D is a viewing distance of the human eye, and L is a width that can be seen by the human eye within a viewing angle range of one degree. The cycle is a sum of a line spacing between two adjacent first wires 321 and a line width of the first wire 321, or a sum of a line spacing between two adjacent second wires 322 and a line width of the second wire 322. X is the frequency, representing the horizontal axis of the curve of the visual contrast sensitivity function (CSF).

It can be obtained from the above formula that, in order to increase the calculated horizontal coordinate value of the curve of the visual contrast sensitivity function (CSF), it is necessary to set the line spacing of the first wire 321 or the line spacing of the second wire 322 to be smaller.

Figure 10:
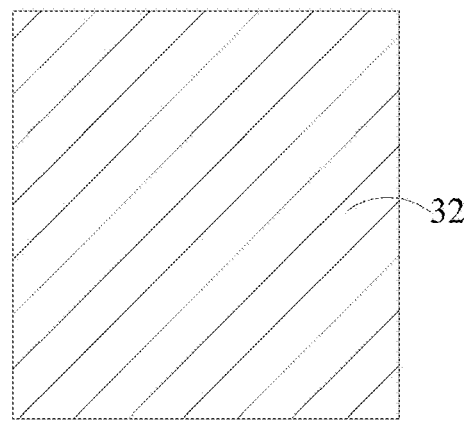
FIG. 10 is a schematic diagram of a partial structure of a conductive sheet of a near-field communication antenna in FIG. 1.

In some embodiments of the present disclosure, as shown in FIG. 10, the coil structure 35 can also include multiple conductive sheets. The conductive sheet can be provided as an intact sheet, that is, the conductive sheet is not a grid structure, but an intact sheet structure. The multiple conductive sheets are connected and surrounded to form a coil structure. In such case, the material of the coil structure 35 is a transparent conductive material, such as ITO (tin doped indium oxide), AZO (aluminum doped zinc oxide), etc. ITO and AZO have large bandgap widths, only absorbing ultraviolet light and not absorbing visible light. Even if the conductive sheets cover pixels, displaying will not be affected. The coil structure 35 provided in this way can greatly reduce the resistance of the near-field communication antenna 32, which is conducive to improving the sensitivity and the communication distance of the near-field communication antenna 32, so as to achieve a larger communication distance with a smaller coil area.

The coil structure 35 can include at least one coil part 351 and at least two leading-out ends 352. In the case where the at least one coil part 351 includes multiple coil parts 351, the multiple coil parts 351 are arranged in an array on a side of the second base substrate 31.

Figure 11:
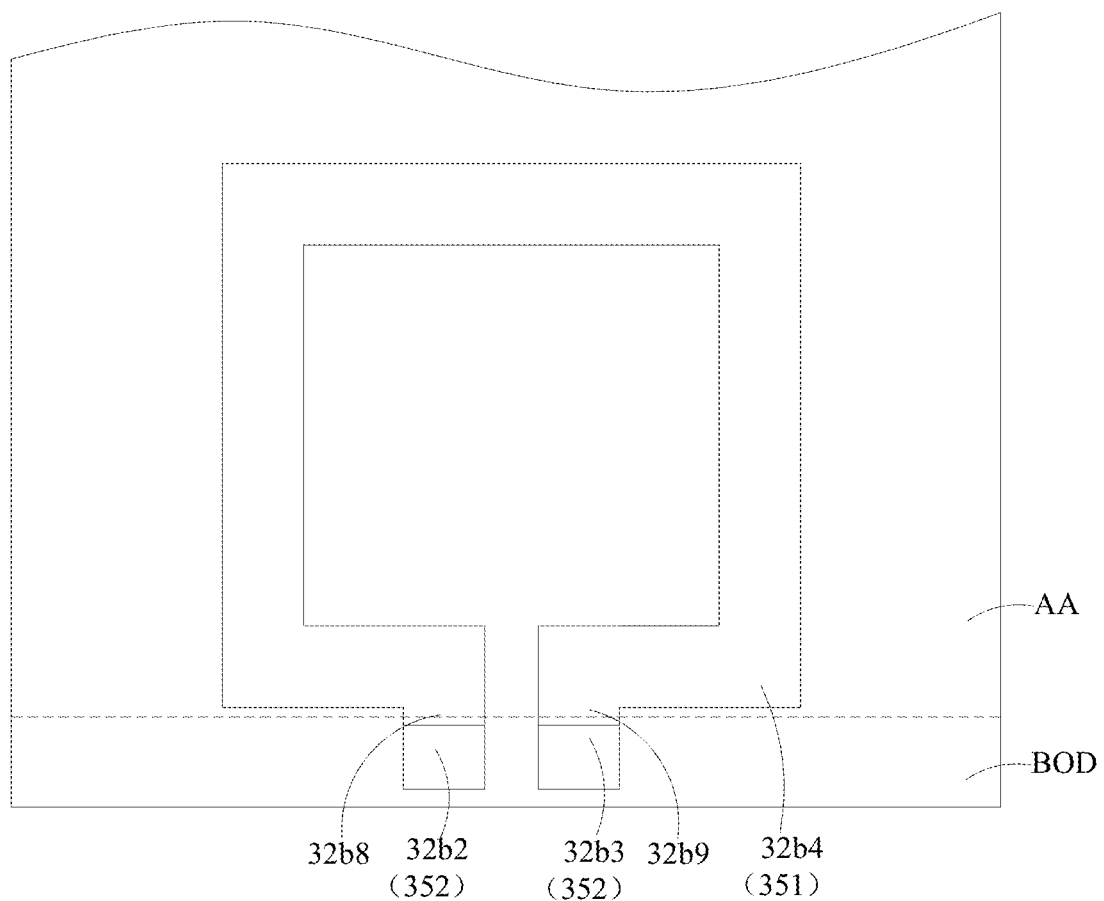
FIG. 11 is a schematic top view of a structure of a near-field communication antenna with a single-turn coil.

As shown in FIG. 11, the coil part 351 can be a single-turn coil 32b4. The leading-out end 352 is provided as two ends, namely a first leading-out end 32b2 and a second leading-out end 32b3. The first leading-out end 32b2 and the second leading-out end 32b3 are respectively connected to a head connection end 32b8 and a tail connection end 32b9 of the coil part. That is, the first leading-out end 32b2 is connected to the head connection end 32b8 of the single-turn coil 32b4, and the second leading-out end 32b3 is connected to the tail connection end 32b9 of the single-turn coil 32b4. The near-field communication antenna 32 with the single-turn coil 32b4 can be used for functions such as mobile payment, electronic ticket, and access control.

Figure 12:
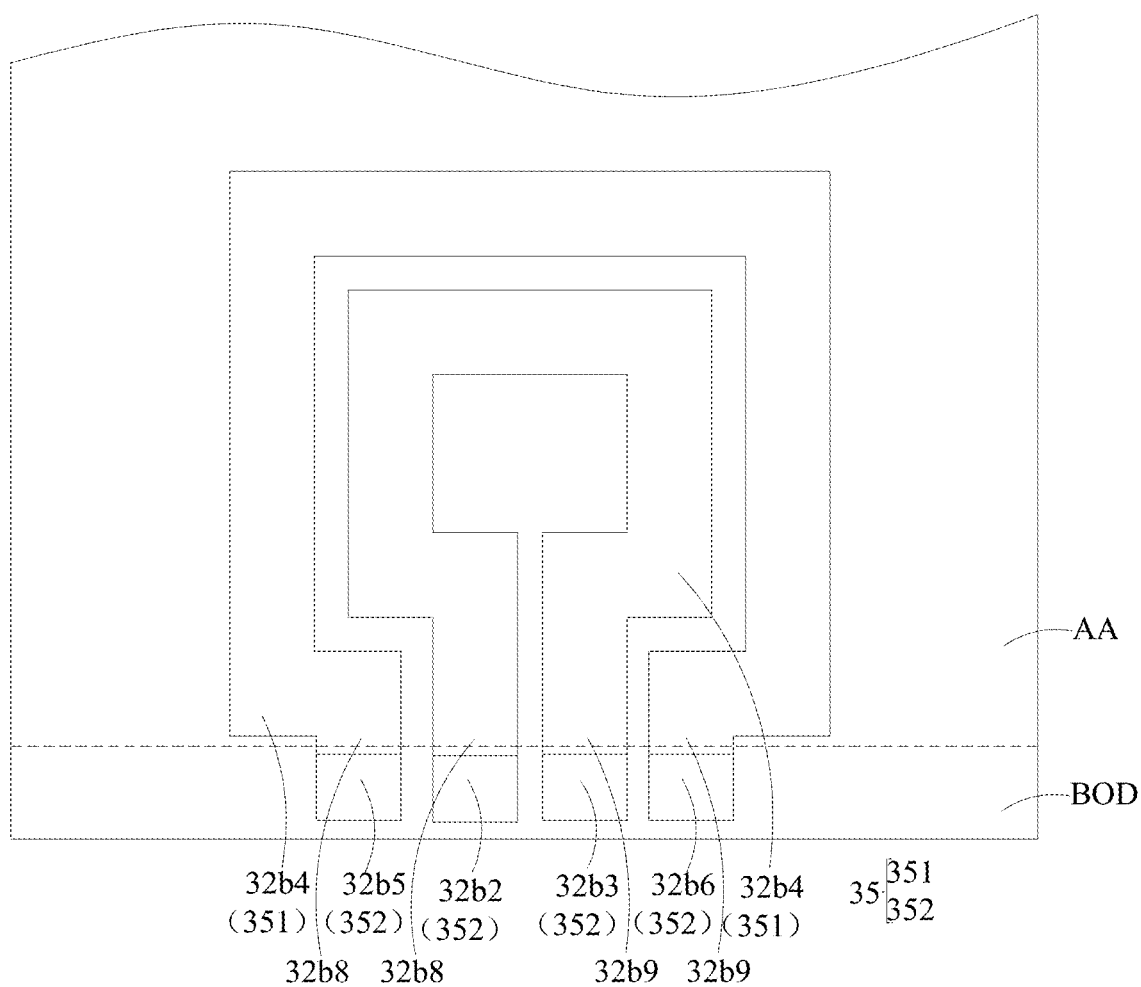
FIG. 12 is a schematic top view of a structure of a near-field communication antenna with multiple single-turn coils.

The coil part 351 can be a multi-turn coil, and the number of turns of the multi-turn coil is at least two turns. For example, as shown in FIG. 12, the coil part 351 can be a double-turn coil, which can include two nested single-turn coils 32b4, namely an inner-turn coil and an outer-turn coil. The inner-turn coil and the outer-turn coil form a shape of a Chinese character "回". If the two single-turn coils are not connected to each other in the display area AA, four leading-out ends 352 need to be provided, namely a first leading-out end 32b2, a second leading-out end 32b3, a third leading-out end 32b5, and a fourth leading-out end 32b6. The first leading-out end 32b2 and the second leading-out end 32b3 are respectively connected to a head connection end 32b8 and a tail connection end 32b9 of the inner-turn coil, and the third leading-out end 32b5 and the fourth leading-out end 32b6 are respectively connected to a head connection end 32b8 and a tail connection end 3269 of the outer-turn coil. The near-field communication antenna 32 with the multi-turn coil can be used for functions such as positioning.

Each single-turn coil 32b4 has an opening, a head connection end 32b8, and a tail connection end 32b9. Therefore, two single-turn coils 32b4 have two openings. The two openings are located on the same side of the double-turn coil, and the openings of the single-turn coils 32b4 are sequentially reduced from the outer-turn coil to the inner-turn coil, allowing the inner-turn coil and the outer-turn coil to be connected to their respective leading-out ends 352 without crossing each other, so that the circuit can be simply provided, the production efficiency can be improved, and the costs can be reduced.

In some embodiments of the present disclosure, the coil part 351 can also be a three-turn coil, which can include three single-turn coils 32b4. Each single-turn coil 32b4 has an opening, a head connection end 32b8, and a tail connection end 32b9. One single-turn coil 32b4 requires two leading-out ends 352. Therefore, the number of leading-out ends 352 is twice the number of single-turn coils 32b4. The three openings are located on the same side of the three-turn coil, and the openings of the single-turn coils 32b4 are sequentially reduced from the outer-turn coil to the inner-turn coil. A specific quantity will not be repeated.

It should be noted that the second leading-out end 32b3 and the third leading-out end 32b5 can be connected by arranging a connection structure on a first flexible circuit board, or the second leading-out end 32b3 can be connected to the fourth leading-out end 32b6. That is, the inner-turn coil and the outer-turn coil can be connected into one coil through the connection structure on the first flexible circuit board.

From the section view, as shown in FIGS. 1-4, 11, and 12, the near-field communication antenna 32 can include a second metal layer 32b and an insulation layer sequentially stacked. The second metal layer 32b can include a single-turn coil 32b4, a double-turn coil, or a multi-turn coil. The second metal layer 32b can also include at least two leading-out ends 352, which are directly connected to the single turn coil 32b4. The single-turn coil 32b4, the double-turn coil or the multi-turn coil, and the leading-out end 352 are formed through one same patterning process.

Figure 13:
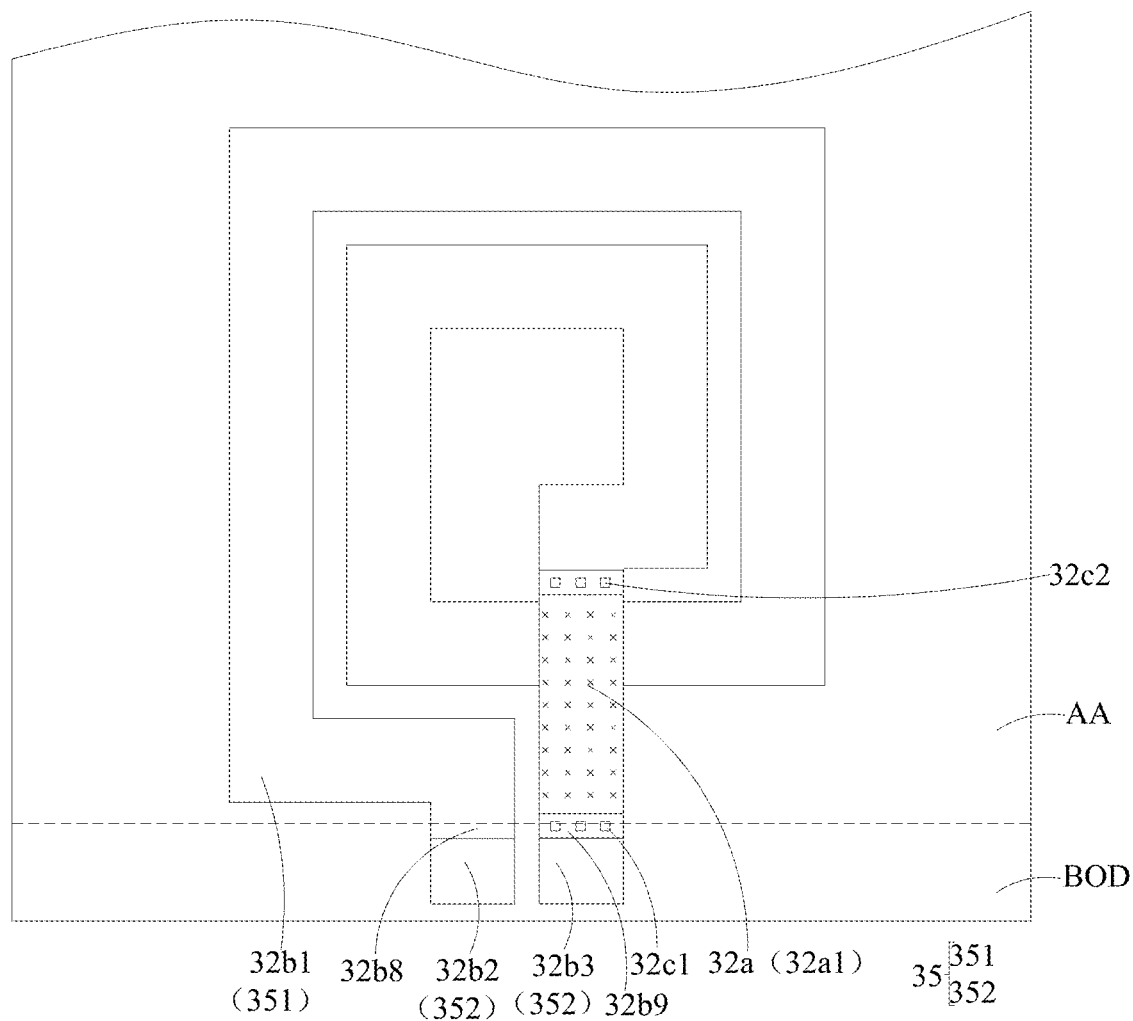
FIG. 13 is a schematic top view of a structure of an example near-field communication antenna with multiple turns of spiral coil.

As shown in FIG. 13, the coil part 351 can be a double-turn coil. The double-turn coil is a helical structure, and has two connection ends, namely a head connection end 32b8 and a tail connection end 32b9. The head connection end 3268 of the double-turn coil is located inside the coil, and the tail connection end 32b9 is located outside the double-turn coil. The tail connection end 32b9 located outside the double-turn coil is directly connected to a first leading-out end 32b2, and the head connection end 32b8 located inside the double-turn coil is connected to a second leading-out end 32b3 through a bridge structure.

Figure 14:
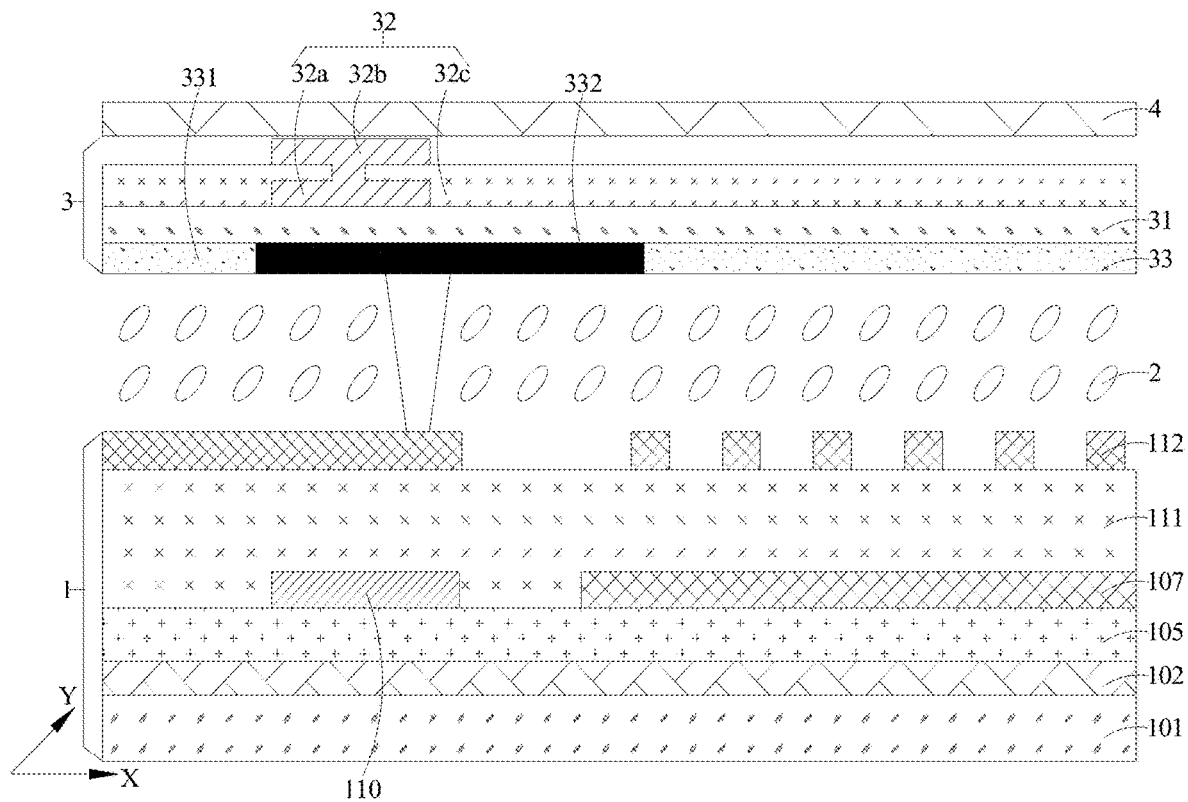
FIG. 14 is a schematic diagram of a structure of an example display panel according to embodiments of the present disclosure.
Figure 15:
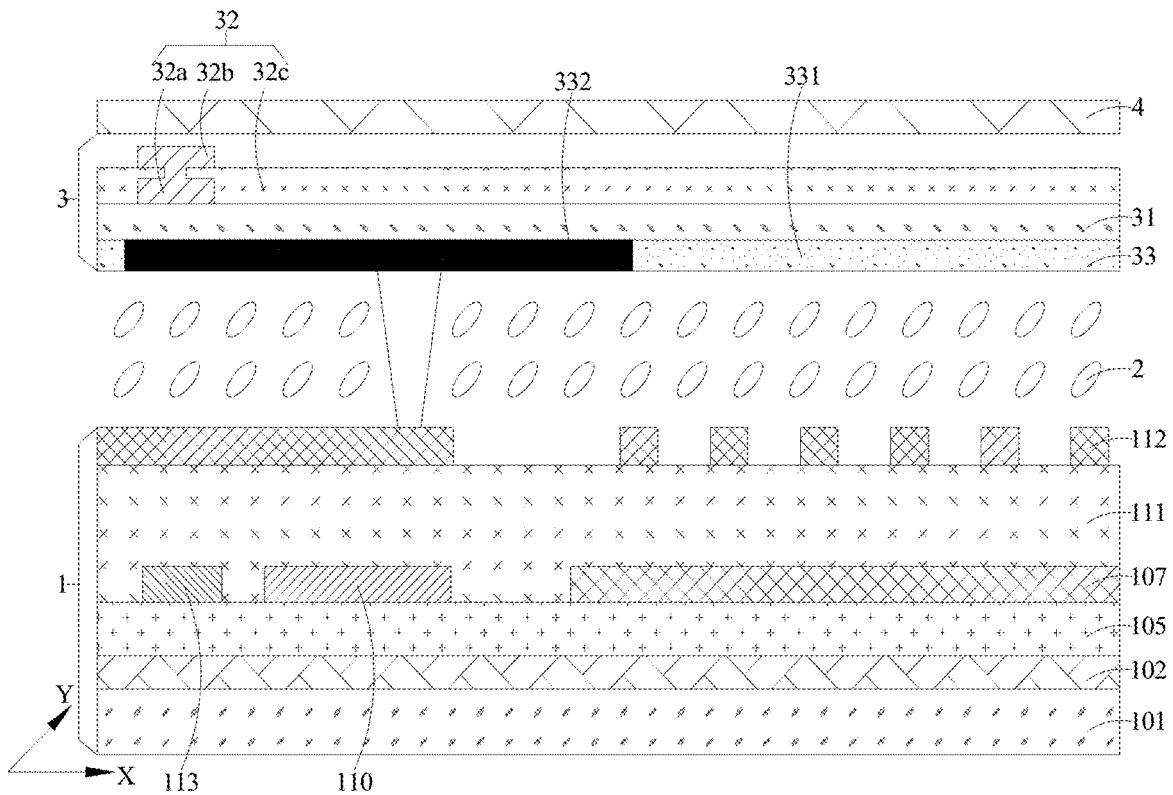
FIG. 15 is a schematic diagram of a structure of an example display panel according to embodiments of the present disclosure.

In some embodiments, from the section view, as shown in FIGS. 14 and 15, the near-field communication antenna 32 can include a first metal layer 32a, a second insulation layer 32c, and a second metal layer 32b sequentially stacked. The second metal layer 32b can include double turns of spiral coil, a first leading-out end 32b2, and a second leading-out end 32b3. The first leading-out end 32b2 is directly connected to the tail connection end 32b9 of the double turns of spiral coil as a whole. The second leading-out end 32b3 and the double turns of spiral coil as well as the first leading-out end 32b2 are arranged in spaced manner, meaning there is no connection between the second leading-out end 32b3 and the double turns of spiral coil, and no connection between the second leading-out end 32b3 and the first leading-out end 32b2. Multiple first via holes 32c1 and multiple second via holes 32c2 are provided in the second insulation layer 32c. The multiple first via holes 32cl are connected to the second leading-out end 32b3, and the multiple second via holes 32c2 are connected to the head connection end 32b8 of the double turns of spiral coil. The first metal layer 32a includes a bridging strip 32a1. One end of the bridging strip 32a1 is connected to the second leading-out end 32b3 through the multiple first via holes 32c1, and the other end of the bridging strip 32a1 is connected to the head connection end 3268 of the double turns of spiral coil through the multiple second via holes 32c2, so as to be connected to the second leading-out end 32b3 and the head connection end 3268 of the double turns of spiral coil through the bridging strip 32a1.

The second metal layer 32b has a larger area, which causes greater interference to the battery of the array substrate 1. The first metal layer 32a has a smaller area, which causes less interference to the battery of the array substrate 1. The second metal layer 32b is further away from the array substrate 1 relative to the first metal layer 32a, resulting in less interference of the near-field communication antenna 32 to the battery of the array substrate 1.

It should be noted that the coil part 351 can also be multiple turns of spiral coil 32b1. In the case where the multi-turn coil is provided as a spiral coil part 351, there are only two connection ends, namely a head connection end 32b8 and a tail connection end 32b9. The connection structure between the two connection ends of the multiple turns of spiral coil 32b 1 and the first and second leading-out ends 32b2 and 32b3 is the same as the connection structure between the two connection ends of the double-turn coil and the first and second leading-out ends 32b2 and 32b3, which will not be repeated here.

In the case where fewer coil parts 351 are arranged, the leading-out end 352 can be arranged in the binding area BOD, and the leading-out end 352 is directly bound to the flexible circuit board. That is, the leading-out end 352 can be used as the binding pin 5.

Figure 16:
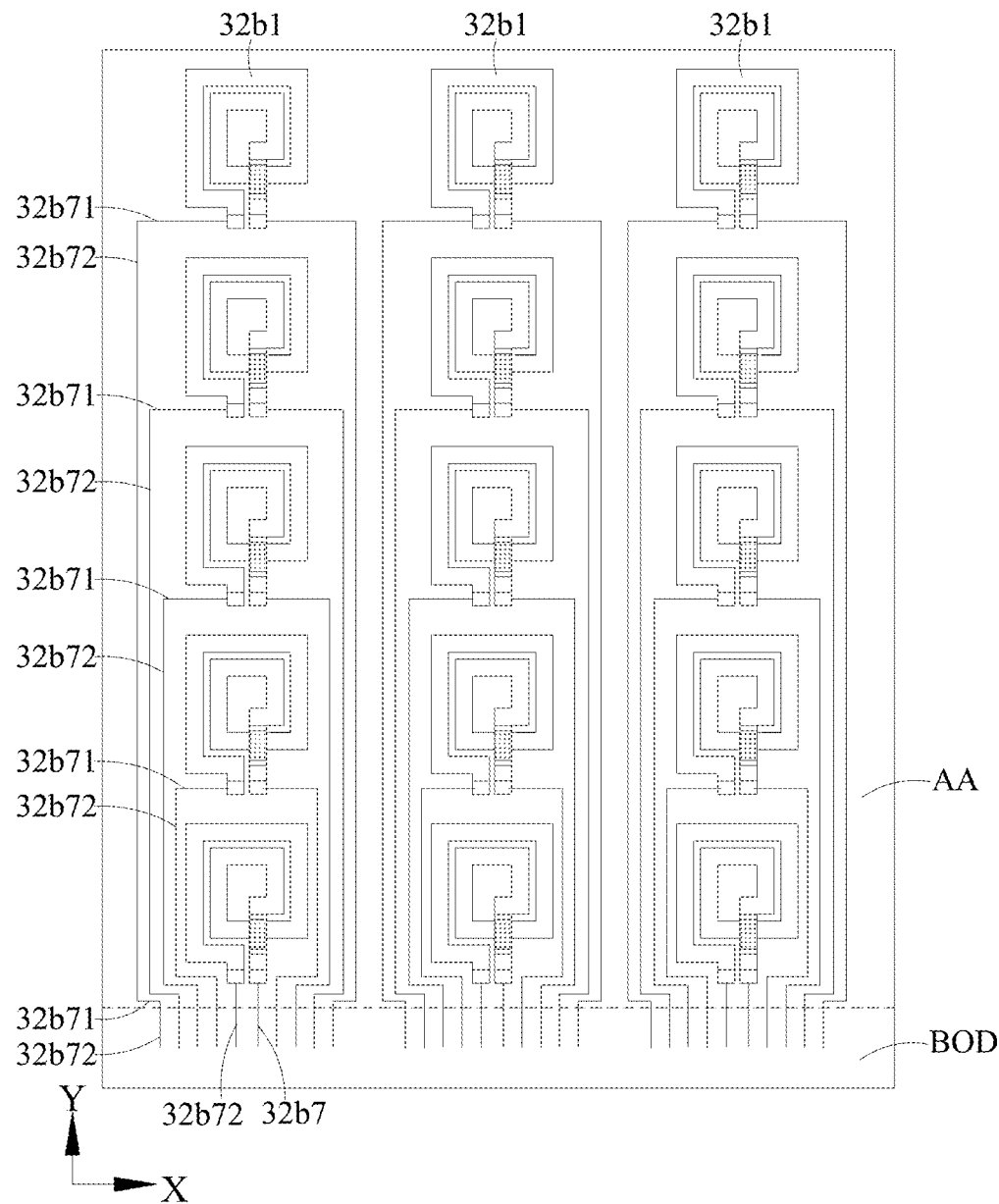
FIG. 16 is a schematic diagram of a near-field communication antenna including multiple coil structures.

Referring to FIG. 16, in the case where more coil parts 351 are arranged, an array of multiple coil parts 351 is arranged on a side of the second base substrate 31. The second base substrate 31 can be evenly divided into several equally sized sensing regions. In each sensing region, one coil structure 35 can be designed, with multiple coil structures 35 having the same sensing distance. The area and the shape of the coil structure 35 can be optimized by simulating parameters such as resistance and length of the coil, to ensure that the sensing distance of the coil structure 35 in each sensing region is equal. Multiple coil structures 35 can be independent of each other. For example, in a functional card recognition application of a game console, the functional card activates a specific function by sensing an NFC antenna in a specific sensing region.

The leading-out ends 352 of multiple coil parts 351 cannot all be arranged in the binding area BOD, and need to be connected to the binding area BOD through the connection lines 32b7. In this case, in order to reduce the number of connection lines 32b7, the coil part 351 can be a single-turn coil 32b4, double turns of spiral coil, or multiple turns of spiral coil 32b1. In this case, one coil part 351 only has two leading-out ends 352, and one coil part 351 only needs to be led out through two connection lines 32b7. The two connection lines 32b7 are a first connection line 32b7 and a second connection line 32b7. One end of the first connection line 32b7 is connected to the first leading-out end 32b2, and the other end of the first connection line 32b7 is connected to the binding area BOD. One end of the second connection line 32b7 is connected to the second leading-out end 32b3, and the other end of the second connection line 32b7 is connected to the binding area BOD.

The connection line 32b7 can include a first part 32b71 and a second part 32b72, with the first part 32b71 extending in the first direction and the second part 32b72 extending in the second direction. Orthographic projections of the first parts 32b71 on the first base substrate 101 are located within orthographic projections of the gate lines 104 on the first base substrate 101, or the orthographic projections of the first parts 32b71 on the first base substrate 101 coincide with the orthographic projections of the gate lines 104 on the first base substrate 101. Orthographic projections of the second parts 32b72 on the first base substrate 101 are located within orthographic projections of the data lines 110 on the first base substrate 101, or the orthographic projections of the second parts 32b72 on the first base substrate 101 coincide with the orthographic projections of the data lines 110 on the first base substrate 101. As a result, the orthographic projections of the first parts 32b71 on the first base substrate 101 and the orthographic projections of the second parts 32b72 on the first base substrate 101 are both located within an orthographic projection of the black matrix 332 on the first base substrate 101. Due to the fact that the first part 32b71 and the second part 32b72 are opaque, it is possible to avoid the impact of the first part 32b71 and the second part 32b72 on the aperture ratio of the display panel. The quantities of the first parts 32b71 and the second parts 32b72 can also be arranged according to needs.

In some embodiments, the connection line 32b7 can only include the first part 32b71, and the quantity of the first parts 32b71 can also be arranged according to the needs. The connection line 32b7 can only include the second part 32b72, and the quantity of the second parts 32b72 can also be arranged according to the needs, as long as the leading-out end 352 of the coil part 351 can be connected to the binding area BOD.

It should be noted that the connection lines 32b7 can be arranged on the same layer as the double turns of spiral coil, the first leading-out end 32b2, and the second leading-out end 32b3, with the same material being used. That is, the second metal layer 32b can also include the connection lines 32b7, which can be directly connected to the first leading-out end 32b2 or the second leading-out end 32b3, so as to provide a simpler circuit, improve the production efficiency, and reduce costs.

In the above embodiments, the binding area BOD are all arranged at the bottom of the display panel. However, the binding area BOD can also be arranged at the top, the left, the right, and so on of the display panel according to needs.

In some embodiments of the present disclosure, the display panel can also include a first flexible circuit board and a near-field communication chip (not shown in the figures). The first flexible circuit board is bound to the near-field communication antenna 32 in the binding area BOD of the non display area. The near-field communication chip is arranged on the first flexible circuit board, and the operation of the near-field communication antenna 32 can be controlled through the near-field communication chip. The signals generated by the near-field communication chip can be transmitted through the near-field communication antenna 32.

In the case where the display panel is a liquid crystal display panel and the near-field communication antenna 32 is arranged on a side of the second base substrate 31 close to the array substrate 1, the leading-out end 352 of the near-field communication antenna 32 or the connection line 32b7 can be connected, through the side binding structure, to a side of the second base substrate 31 away from the array substrate 1, facilitating the binding of the first flexible circuit board and the near-field communication antenna 32.

Figure 17:
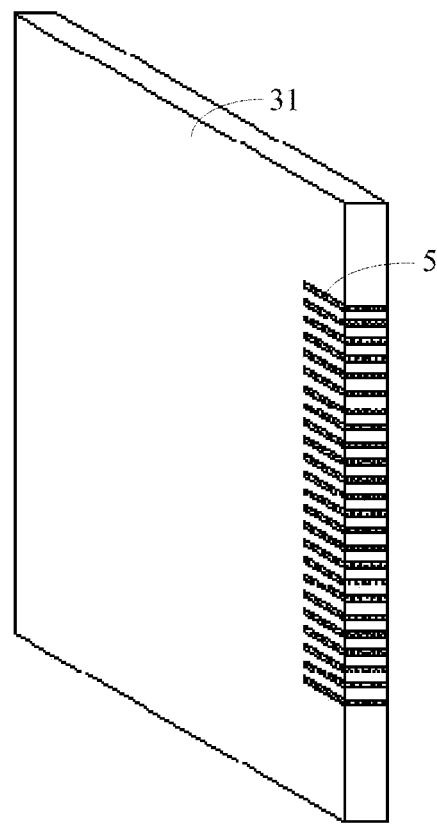
FIG. 17 is a three-dimensional schematic diagram of a side binding structure of a display panel according to embodiments of the present disclosure.
Figure 18:
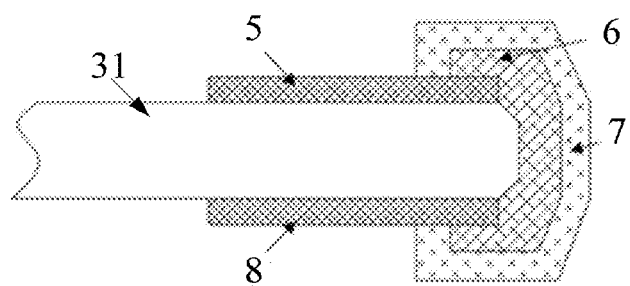
FIG. 18 is a schematic section view of FIG. 17.

In some embodiments, as shown in FIGS. 17 and 18, one end of the connection line 32b7 or the leading-out end 352 can be used as a connection pin 8 of the near-field communication antenna 32. A binding pin 5 is provided in the binding area BOD on a side of the second base substrate 31 away from the near-field communication antenna 32. The binding pin 5 is in one-to-one correspondence with the connection pin 8, and an orthographic projection of the binding pin 5 on the second base substrate 31 coincides with an orthographic projection of the connection pin 8 on the second base substrate 31.

A conductive film 6 is covered on a side where the connection pin 8 and the binding pin 5 are away from the second base substrate 31, and a portion of the conductive film 6 is also wrapped on an end surface of the second base substrate 31 in the binding area BOD. The conductive film 6 can be anisotropic conductive adhesive, thereby connecting the connection pin 8 and the binding pin 5 through the conductive film 6. After the first flexible circuit board is bound to the binding pin 5, signals can be transmitted between the near-field communication chip and the near-field communication antenna 32.

The array substrate 1 can be bound to the second flexible circuit board. The specific binding process will not be repeated here.

In some embodiments, in the case where a position of the near-field communication antenna 32 is convenient for binding, the side binding structure can be omitted, and one end of the connection line 32b7 or the leading-out end 352 can be directly bound to the first flexible circuit board.

In some embodiments, an edge of the end surface of the second base substrate 31 wrapped by the conductive film 6 is provided with a chamfer, which can be a circular chamfer or an oblique chamfer. A thickness of the conductive film 6 can be made uniform throughout the film, avoiding friction between the edge of the second base substrate 31 and the conductive film 6 during subsequent use, which may cause the conductive film 6 to break.

Figure 19:
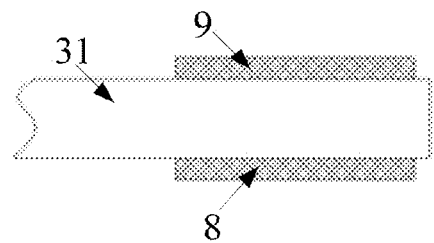
FIGS. 19 to 22 are schematic structural diagrams of various steps involved in forming a side binding structure.
Figure 20:
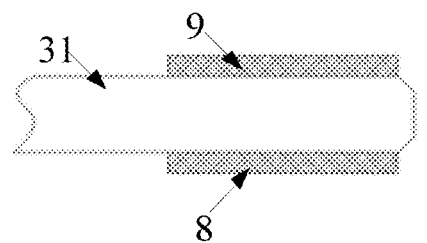
Figure 21:
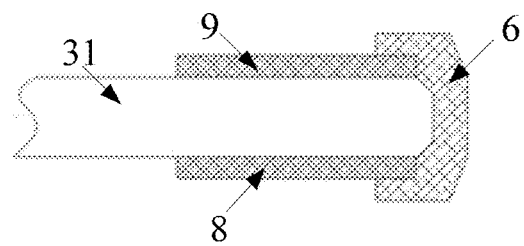
Figure 22:
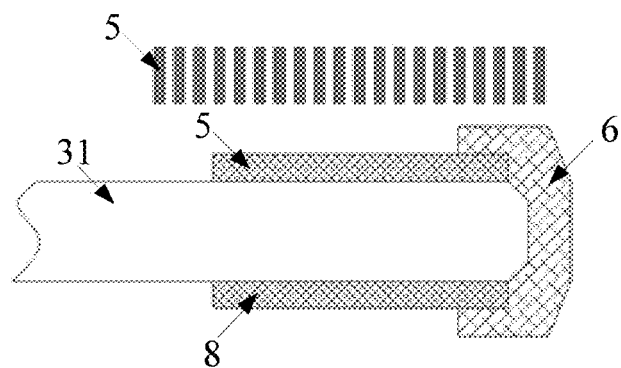

As shown in FIG. 19, a material layer 9 for the binding pin is formed on a side of the second base substrate 31 away from the near-field communication antenna 32 by using magnetron sputtering. As shown in FIG. 20, the chamfer process is performed on an end surface of one end of the second base substrate 31 being provided with the binding pin 5. As shown in FIG. 21, the conductive film 6 is coated on the end of the second base substrate 31 being provided with the binding pin 5, and the conductive film 6 is connected to the material layer 9 for the binding pin and the connection pin 8. As shown in FIG. 22, the laser etching technology is used to etch the material layer 9 for the binding pin to form the binding pin 5. As shown in FIG. 18, a protection layer 7 is formed on a side of the conductive film 6 away from the second base substrate 31. A material of the protection layer 7 can be ink, which can prevent oxidation, external damage, and so on.

In the case where the display panel is an OLED display panel, the leading-out end 352 of the near-field communication antenna 32 or the connection line 32b7 can be connected, through the side binding structure, to a side of the first base substrate 101 away from the near-field communication antenna 32, facilitating the binding of the first flexible circuit board with the near-field communication antenna 32 and the array substrate 1.

In some embodiments, one end of the connection line 32b7 or the leading-out end 352 can be used as the connection pin 8 of the near-field communication antenna 32. A binding pin 5 is provided in the binding area BOD on a side of the first base substrate 101 away from the near-field communication antenna 32. The binding pin 5 is in one-to-one correspondence with the connection pin 8, and an orthographic projection of the binding pin 5 on the first base substrate 101 coincides with an orthographic projection of the connection pin 8 on the first base substrate 101.

A conductive film 6 is covered on a side where the connection pin 8 and the binding pin 5 are away from the first base substrate 101, and a portion of the conductive film 6 is also wrapped on an end surface of the first base substrate 101 in the binding area BOD. The conductive film 6 can be anisotropic conductive adhesive, thereby connecting the connection pin 8 and the binding pin 5 through the conductive film 6. After the first flexible circuit board is bound to the binding pin 5, signals can be transmitted between the near-field communication chip and the near-field communication antenna 32.

In some embodiments, an edge of the end surface of the first base substrate 101 wrapped by the conductive film 6 is provided with a chamfer, which can be a circular chamfer or an oblique chamfer. A thickness of the conductive film 6 can be made uniform throughout the film, avoiding friction between the edge of the first base substrate 101 and the conductive film 6 during subsequent use, which may cause the conductive film 6 to break.

In some embodiments of the present disclosure, the display panel can also include an anti-reflective layer 4, which is provided on a side of the color film substrate 3 away from the array substrate 1. The anti-reflective layer 4 can be a composite film, including a high refractive index film layer and a low refractive index film layer. The high refractive index film layer and the low refractive index film layer are alternately stacked, so that the light reflected by the metal layer of the near-field communication antenna 32 can interfere, thereby reducing the emission of the reflected light. The anti-reflective layer 4 can prevent the reflection of the metal layer of the near-field communication antenna 32 from affecting the display effect of the display.

Based on the same inventive concept, embodiments of the present disclosure also provide a display device, which can include a display panel as described in any of the above embodiments. The specific structure of the display panel has been explained in detail above, and thus it will not be repeated here.

The specific type of display device is not subject to special restrictions, and the types of commonly used display devices in the art can be used, for example, mobile devices such as mobile phones, wearable devices such as watches, VR devices, etc. Those skilled in the art can choose according to the specific purpose of the display device, which will not be repeated here.

It should be noted that in addition to the display panel, the display device further includes other necessary parts and components. Taking the display as an example, such as a casing, a circuit board, a power cord, etc. Those skilled in the art can supplement accordingly according to the specific usage requirements of the display device, which will not be repeated here.

Compared with the prior art, the beneficial effects of the display device provided by embodiments of the present disclosure are the same as those of the display panel provided by aforementioned embodiments, which will not be repeated here.

After considering the specification and practicing of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

What is claimed is:

1. A display panel comprising a display area and a binding area, wherein the display panel comprises:
    a color film substrate comprising a near-field communication antenna, wherein the near-field communication antenna comprises a coil structure, the coil structure is at least partially located in the display area, and the coil structure is provided as a metal grid structure; wherein the metal grid structure comprises multiple first wires and multiple second wires, wherein the first wires extend along a first direction, the second wires extend along a second direction, the first direction intersects with the second direction, and the multiple first wires are connected with the multiple second wires to form the metal grid structure; and wherein the first wires are provided with gap parts, and the gap parts comprise closed gap parts or open gap parts, and wherein an orthographic projection of the channel region on the first base substrate is located within orthographic projections of the gap parts on the first base substrate, or the orthographic projection of the channel region on the first base substrate coincides with the orthographic projections of the gap parts on the first base substrate; and
    an array substrate comprising a first base substrate, a channel region, and a non channel region, wherein an orthographic projection of the coil structure on the first base substrate is located within an orthographic projection of the non channel region on the first base substrate.

2. The display panel according to claim 1, wherein the first wires comprise:
    multiple annular wires, wherein the gap parts are provided at the annular wires, and the gap parts are closed gap parts; and
    multiple connection wires connected between two adjacent annular wires in the first direction;
    wherein each of the second wires is connected between two adjacent annular wires in the second direction.

3. The display panel according to claim 1, wherein the array substrate further comprises gate lines and data lines, the gate lines extend in the first direction, and the data lines extend in the second direction, and wherein orthographic projections of the first wires on the first base substrate are located within orthographic projections of the gate lines on the first base substrate, or the orthographic projections of the first wires on the first base substrate coincide with the orthographic projections of the gate lines on the first base substrate.

4. The display panel according to claim 3, wherein orthographic projections of the second wires on the first base substrate are located within orthographic projections of the data lines on the first base substrate, or the orthographic projections of the second wires on the first base substrate coincide with the orthographic projections of the data lines on the first base substrate.

5. The display panel according to claim 3, further comprising a touch pattern, wherein the touch pattern comprises multiple touch wires, and the touch wires extend in the second direction, and wherein orthographic projections of the second wires on the first base substrate are located within orthographic projections of the touch wires on the first base substrate, or the orthographic projections of the second wires on the first base substrate coincide with the orthographic projections of the touch wires on the first base substrate.

6. The display panel according to claim 1, wherein the coil structure comprises multiple conductive sheets, the conductive sheets are provided as intact sheets, and the multiple conductive sheets surround to form a coil, and wherein a material of the coil structure is a transparent conductive material.

7. The display panel according to claim 1, wherein the coil structure comprises:
    at least one coil part; and
    at least two leading-out ends respectively connected to a head connection end and a tail connection end of the coil part.

8. The display panel according to claim 7, wherein the coil part comprises multiple turns of spiral coil.

9. The display panel according to claim 8, wherein the head connection end of the multiple turns of spiral coil is located inside the multiple turns of spiral coil, the tail connection end of the multiple turns of spiral coil is located outside the multiple turns of spiral coil, the tail connection end is connected to one of the at least two leading-out ends, and the head connection end is bridged to the other of the at least two leading-out ends.

10. The display panel according to claim 9, wherein the near-field communication antenna comprises:
    a first metal layer comprising a bridging strip;
    a second metal layer comprising the multiple turns of spiral coil, a first leading-out end, and a second leading-out end, wherein the first leading-out end is connected to the tail connection end of the multiple turns of spiral coil, and the second leading-out end is connected to the head connection end of the multiple turns of spiral coil through the bridging strip, and wherein the second metal layer is further away from the array substrate relative to the first metal layer; and
    a second insulation layer provided between the first metal layer and the second metal layer, wherein a first via hole and a second via hole are provided in the second insulation layer, one end of the bridging strip is connected to the second leading-out end through the first via hole, and the other end of the bridging strip is connected to the head connection end through the second via hole.

11. The display panel according to claim 7, wherein the coil part comprises multiple nested single-turn coils, and the single-turn coils comprise openings, head connection ends, and tail connection ends, and wherein the openings are located on the same side of the single-turn coils, and the openings are sequentially reduced from an outer-turn coil to an inner-turn coil of the single-turn coils.

12. The display panel according to claim 7, wherein the leading-out ends are provided in the binding area.

13. The display panel according to claim 7, wherein the leading-out ends are provided in the display area, and the near-field communication antenna further comprises:
    at least two connection lines, wherein some ends of the connection lines are correspondingly connected to the leading-out ends, and the other ends of the connection lines are connected to the binding area.

14. The display panel according to claim 13, wherein the array substrate further comprises gate lines and data lines, and the connection lines comprise first parts and/or second parts, with the first parts extending in a first direction, and the second parts extending in a second direction, and wherein orthographic projections of the first parts on the first base substrate are located within orthographic projections of the gate lines on the first base substrate, or the orthographic projections of the first parts on the first base substrate coincide with the orthographic projections of the gate lines on the first base substrate; and orthographic projections of the second parts on the first base substrate are located within orthographic projections of the data lines on the first base substrate, or the orthographic projections of the second parts on the first base substrate coincide with the orthographic projections of the data lines on the first base substrate.

15. The display panel according to claim 1, wherein the color film substrate further comprises:
   a second base substrate; and
   a light filtering layer provided on a side of the second base substrate close to the array substrate, wherein the near-field communication antenna is provided on a side of the second base substrate away from the light filtering layer, or the near-field communication antenna is provided between the second base substrate and the light filtering layer, or the near-field communication antenna is provided on a side of the light filtering layer away from the second base substrate;
   wherein the light filtering layer comprises a black matrix, and an orthographic projection of the metal grid structure on the first base substrate is located within an orthographic projection of the black matrix on the first base substrate.

16. The display panel according to claim 15, further comprising:
   a first flexible circuit board bound to the near-field communication antenna in the binding area;
   a near-field communication chip provided on the first flexible circuit board;
   a binding pin provided on a side of the first base substrate away from the near-field communication antenna or a side of the second base substrate away from the near-field communication antenna;
   a conductive film connected between the near-field communication antenna and the binding pin, and partially wrapped on an end surface of the first base substrate in the binding area or an end surface of the second base substrate in the binding area, wherein an edge of the end surface of the first base substrate or the second base substrate wrapped by the conductive film is provided with a chamfer;
   a protection layer wrapped on a side of the conductive film away from the first base substrate or the second base substrate; and
   an anti-reflective layer provided on a side of the color film substrate away from the array substrate.

17. The display panel according to claim 16, wherein an edge of the end surface of the first base substrate or the second base substrate wrapped by the conductive film is provided with a chamfer.

18. A display device, comprising the display panel according to claim 1.

* * * * *